United States Patent [19]

Tanaka

[11] Patent Number: 4,835,702
[45] Date of Patent: May 30, 1989

[54] METHOD OF SORTING GOODS AND SYSTEM THEREFOR

[75] Inventor: Nobuhiro Tanaka, Saitama, Japan

[73] Assignee: Kao Corporation, Tokyo, Japan

[21] Appl. No.: 48,432

[22] Filed: May 11, 1987

[30] Foreign Application Priority Data

May 9, 1986 [JP] Japan ............................... 61-106136
May 9, 1986 [JP] Japan ............................... 61-106137

[51] Int. Cl.$^4$ ............................................. G06F 15/20
[52] U.S. Cl. ..................................... 364/478; 414/398
[58] Field of Search ....................... 364/478, 479, 468; 198/349, 356, 358; 414/398, 288, 289, 273; 209/659; 53/390, 391, 504

[56] References Cited

U.S. PATENT DOCUMENTS

| | | | |
|---|---|---|---|
| 3,122,231 | 2/1964 | Pence et al. | 198/358 X |
| 4,053,741 | 10/1977 | Ainoya et al. | 364/478 |
| 4,181,947 | 1/1980 | Krauss et al. | 364/478 |
| 4,545,179 | 10/1985 | Rebsamen et al. | 53/504 X |
| 4,641,271 | 2/1987 | Konishi et al. | 364/478 |

FOREIGN PATENT DOCUMENTS 55-16868 2/1980 Japan.
61-2612 1/1986 Japan.

Primary Examiner—Joseph Ruggiero
Attorney, Agent, or Firm—Cushman, Darby & Cushman

[57] ABSTRACT

A method of sorting goods and a system therefor. An efficient method of sorting goods which arrive in the unit of items into groups which have been determined in advance in the order of delivery in a prescribed quantity so as to allow sequential loading of goods in a truck or the like in first-in-last-out manner. The loading order is dependent on the item and quantity for a destination and/or a number of destinations, and to deal with changes in orders which frequently occur.

The system applicable to this method includes plural assembling and storage conveyors for assembling goods in classified groups, a diverting conveyor which sort out goods arrived in the unit of items into said assembling and storage conveyors and a controlling system which controls said diverting conveyor and the sorting out operation.

19 Claims, 12 Drawing Sheets

METHOD OF SORTING GOODS AND SYSTEM THEREFOR

BACKGROUND OF THE INVENTION

This invention relates to a method for sorting out a large number of goods by items and destinations and a system therefor, and more particularly to a method for speedily and efficiently sorting out goods in the order that they will be delivered trucks or the like and a system therefor.

Methods for sorting out goods and the system therefor in the prior art are disclosed in, for instance, Japanese Patent Applications laid-open No. Sho 55-16868 and No. Sho 61-2612.

Japanese Patent application laid-open No. Sho 55-16868 teaches, in summation, a sorting out system which comprises a trolley conveyor positioned in a manner to run along an oval loop track between sorting chutes, a conveyor for empty tote boxes and a conveyor for tote boxes filled with goods, traversers mounted on said trolley conveyor at least in a number of said chutes and provided with wheels of caster type, and a pool bucket comprising buckets on said traversers.

Japanese Patent Application laid-open No. Sho 61-2612 teaches a method for sorting out goods comprising the steps of carrying goods which have arrived on a conveyor by the first sorting conveyor to plural first-storage conveyors while sorting the goods out, taking out thus roughly sorted out goods on the first-circuit conveyor in the unit of one first-storage conveyor, moving the goods from said first sorting conveyor to a second sorting conveyor which is provided either above or below said first sorting conveyor in parallel thereto, sorting the goods for the second stage while conveying them on the second sorting conveyor and moving them further to plural second storage conveyors, taking thus twice sorted goods on the second circuit conveyor in the unit of one second storage conveyor and then forwarding them to loading stations for trucks.

However, the prior art method and system are detrimental as follows:

The system disclosed in Japanese Patent Application laid-open No. Sho 55-16868 could sort out goods but could not sort them out in accordance with the order of delivery by trucks.

The method disclosed in Japanese Patent Application laid-open No. Sho 61-2612 could load goods on a truck in the order of first-in-last-out so that on the way of transportation by a truck, they can be unloaded in the unit of destinations such as a city, town, village, etc. However, the method requires first and the second sorting steps, and conveying steps to the loading stations for trucks, which cannot be conducted simultaneously. Therefore, the capacity of sorting out is so inferior that the method cannot load goods on a truck as timely and quickly as desired.

An object of this invention is to eliminate those problems encountered in the prior art, and to provide a method for sorting out goods which cannot only sort out goodes sequentially in a manner to allow loading on a truck or the like consecutively in the order of first-in-last-out in accordance to the number of destinations for one delivery, items of goods for each destination and quantity thereof, but also can sort goods efficiently in a manner to deal with changes in orders which may occur for every delivery by taking out goods for several truck loads at one time and sorting them for first-in-last-out for each truck and a system therefor.

The method of sorting goods according to this invention can sort out a large number of goods roughly in the order of delivery, and more particularly can sort out goods efficiently by establishing in advance groups of goods in a number within a predetermined quantity based on data and sorting arriving goods in the unit of items into said groups.

Such quantity is preferably determined in a manner that the number of goods classified into each group becomes substantially equal to each other, the quantity being determined by the longitudinal dimension of goods, and goods should be conveyed in the order of longitudinal sizes starting from longer goods to shorter goods.

In order to achieve aforementioned objects, the system according to this invention includes plural assembling and storage conveyors which assemble goods in predetermined groups, a diverting conveyor which divides the goods which have arrived in the unit of items into said assembling and storage conveyors and a control system which controls said diverting conveyor and sorting operation.

This invention sorting system preferably has two sets of assembling and storage conveyors and a diverting conveyor arranged in two layers.

This invention sorting system preferably includes a computer for physical districution which generates assembling data and diverting data, a computer for facilities control which generates necessary control commands out of said assembling and diverting data and a control means which performs predetermined control with said commands from said facilities control computer.

This invention method can sort out goods in a manner of loading on trucks or the like in first-in-last-out in accordance with the number of destinations for one delivery, and the items or quantity of goods for one destination. The method further can sort goods efficiently in a manner to deal with changes in orders which may occur for every delivery by taking out goods for several truck loads at one time and sorting them for first-in-last-out for each truck. According to this invention method, goods are unlikely to collapse during transportation as they can be piles at even height in a container to secure safe delivery.

BRIEF DESCRIPTION OF THE DRAWINGS

FIGS. 10a and 10b are explanatory views of the operation of diverting conveyor thereof; FIG. 10a shows a plane view and FIG. 10b a frontal view.

FIGS. 11a and 11b are explanatory views of the operation of carrying out device thereof; FIG. 11a is a plane view, and FIG. 11b a side view when viewed from the line A—A.

DETAILED DESCRIPTION OF THE INVENTION

This invention will now be described by referring to preferred embodiments shown in the attached drawings.

Figure 1:
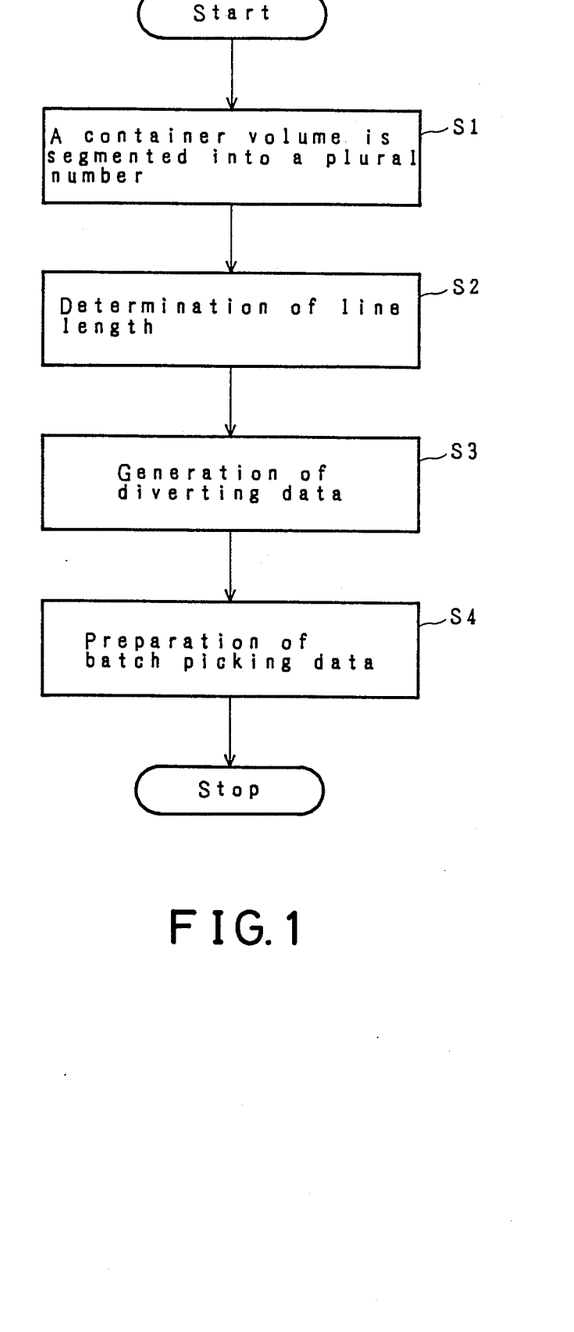
FIG. 1 is a flow chart to show the steps of control data generation for a sorting system according to one embodiment of this invention method.
Figure 2:
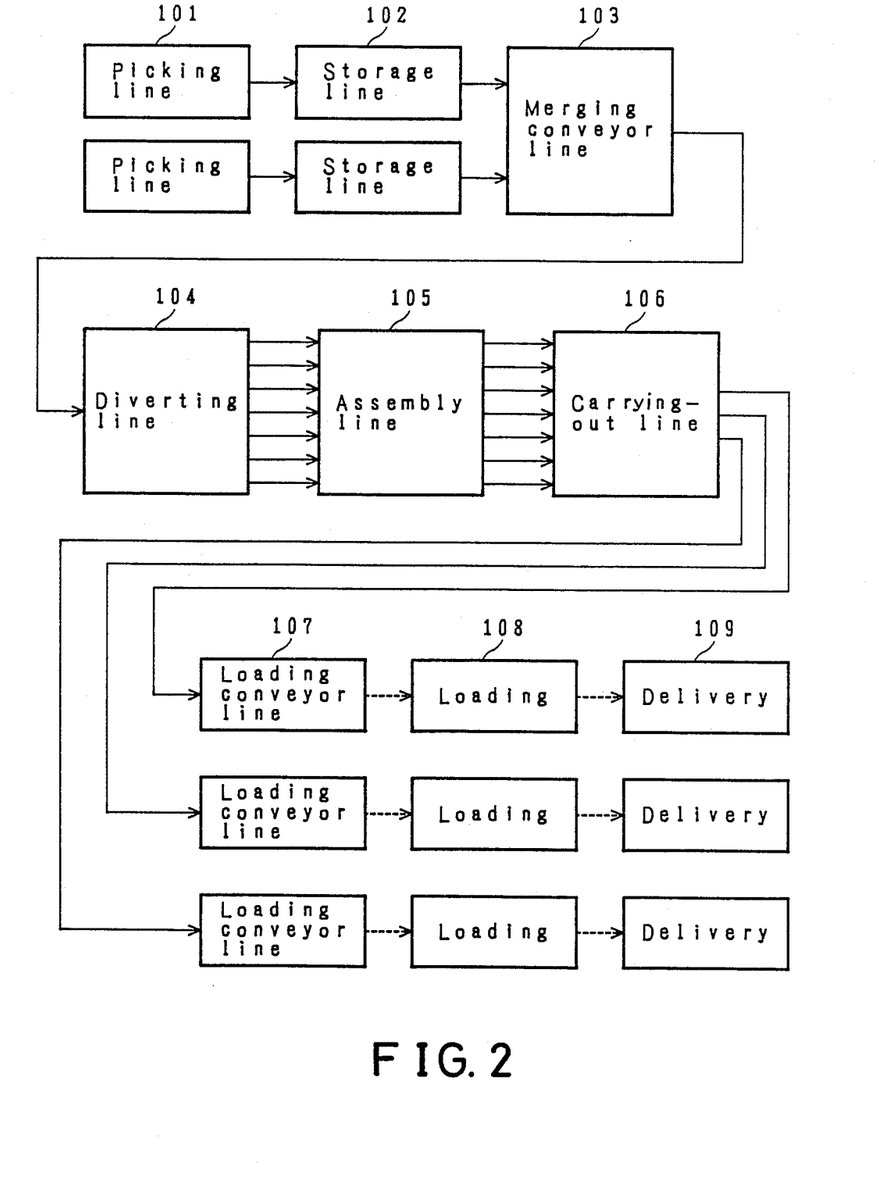
FIG. 2 is a block diagram of an embodiment of physical distribution system to which this invention method is applicable.
Figure 3:
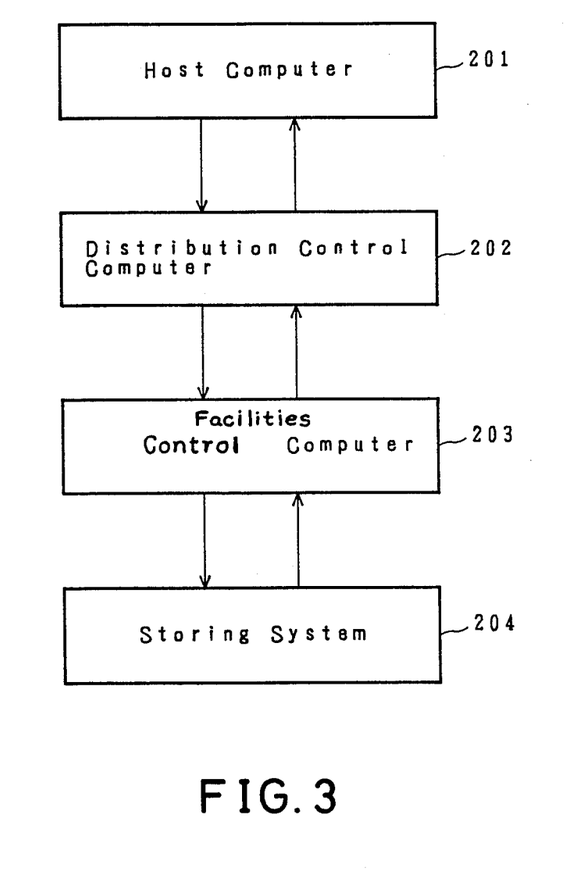
FIG. 3 is a block diagram to show the control system thereof.
Figure 4A:
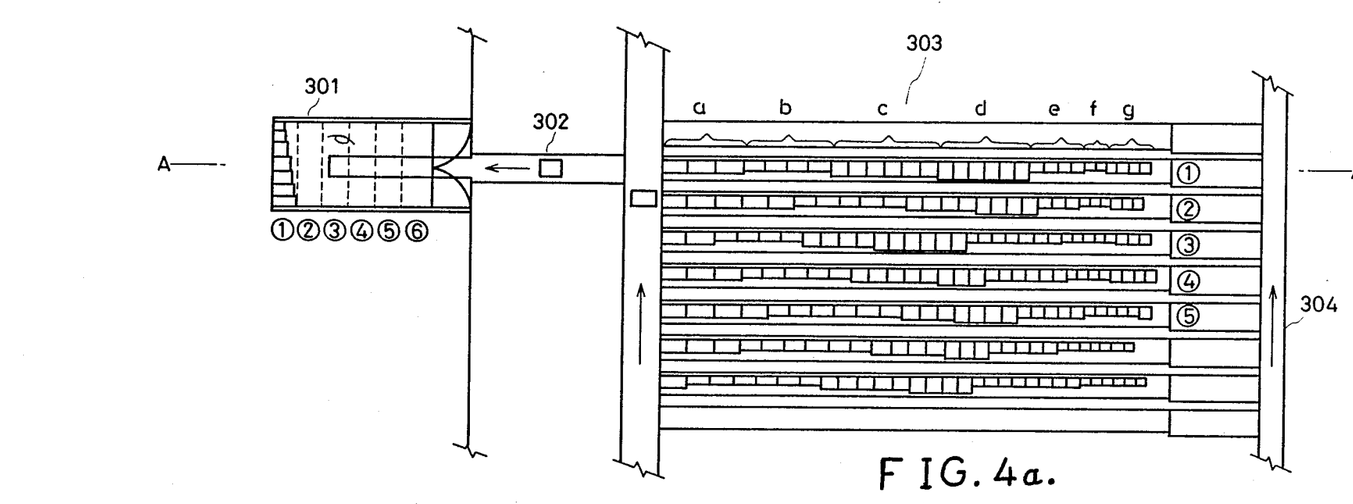
FIG. 4a is a schematic plane view to show essential portions of the sorting system.

FIG. 1 is a flow chart to show the steps of control data generation for the sorting system according to an embodiment of this invention method; FIG. 2 a block diagram to show an embodiment of physical distribution system to which this invention method is applicable; FIG. 3 a block diagram to show the control system thereof; FIG. 4a a schematic plane view of essential portions of the sorting system, FIG. 4b a schematic sectional view of FIG. 4a viewed from the line A—A, and FIG. 5 a schematic cross sectional view to principally show the loaded state of goods in a container according to one embodiment of this invention method.

First, the physical distribution systems shown in FIG. 2 will be described. The reference numeral 101 denotes a picking line where goods are picked up by a picking device in the unit of items (that is, one at time) based on a predetermined batch picking data. The reference numeral 102 denotes a storage line where goods conveyed from the picking line 101 are stored temporarily and taken out in a predetermined amount based on the batch picking data to forward them to the next step. The reference numeral 103 denotes a merging conveyor line where goods arrive from said plural storage lines 102 starting from the one where a predetermined number of goods has been assembled to merge with goods from other lines, and 104 denotes a diverting line where goods are divided and sorted into groups based on the diverting data or sorting group data which have been prepared in advance according to the dimensions for an assembling. The reference numeral 105 denotes an assembling and storage line which stores the thus diverted goods. The reference numeral 106 denotes a carrying-out line where goods are carried out from each assembling and storage line 105 in the unit of a container when a container number (conveyor identification number) is specified. The reference numeral 107 denotes a loading container line where discharged goods are transported to the loading stations, 108 being the loading, and 109 the delivery. The flow of operations from the picking line 101 to the loading conveyor line 107 is controlled automatically by a computer.

FIG. 3 shows the control system with computers which comprises a host computer CPU 201, a physical distribution control computer 202, facilities control computer 203 and a sorting system 204.

The host computer (CPU) 201 controls the physical distribution system as a whole; for example, it prepares a schedule for delivery based on received order data and feeds the schedule to a downstream physical distribution control computer 202. The physical distribution control computer 202 determines groups of goods based on the delivery schedule, prepares diverting data and batch picking data, and outputs them to a facilities control computer 203. The facilities control computer 203 prepares the required control commands based on the diverting and batch picking data, and outputs them to the sorting system 204. The sorting system 204 controls the merging, diverting and carrying out of the goods with a sequencer.

An embodiment of this invention sorting method will be described in detail by referring to FIGS. 1, 4a and 4b.

Figure 4B:
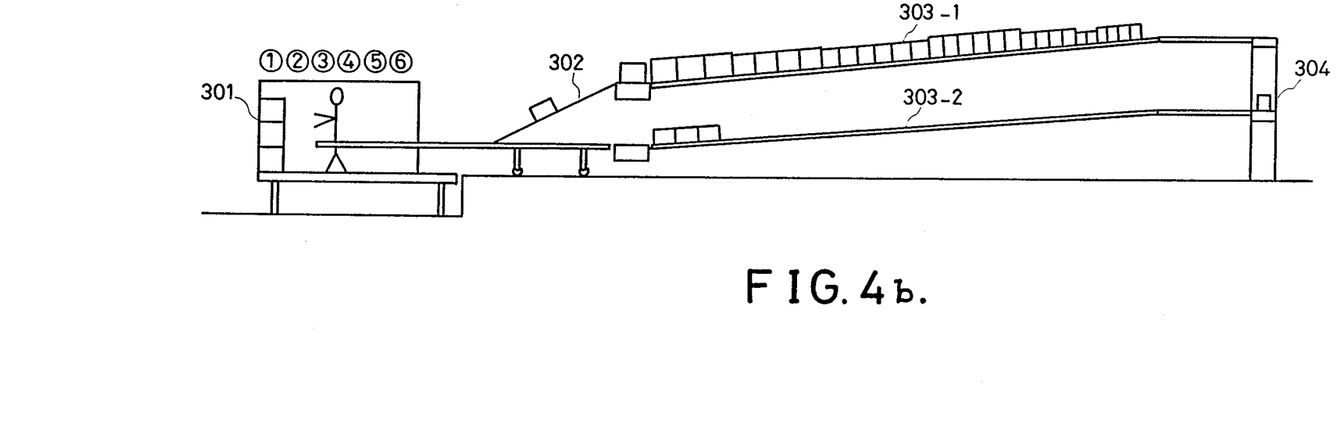
FIG. 4b is a schematic cross section of the system shown in FIG. 4a when viewed from the line A—A.

In FIGS. 4a and 4b, the reference numeral 301 denotes a container on which goods are to be loaded, 302 a container loader, 303 assembling and storage lines, and 304 a diverting line. The assembling and storage lines 303 and the diverting line 304 are provided in two layers. In FIG. 4b, the reference numeral 303-1 denotes an assembling and storage line from which goods are being carried to a container, and 303-2 another assembling and storage line where goods are being sorted. In these figures, goods are shown as squares of respective dimensions.

Description will be given to a case where goods are divided into five segments and loaded in a container 301. The physical distribution control computer 202 generates the necessary data according to the flow chart shown in FIG. 1.

(Step S1) . . . A container volume is segmented into a plural number of segments.

In the case shown in FIGS. 4a and 4b, the volume of a container into which the goods will be loaded (body of a delivery vehicle) 301 is divided into six segments; (1), (2), (3), (4), (5) and (6). In this case, as the container 301 has a door (a take-in/take-out door) at the rear side, the volume thereof is divided longitudinally into six portions. Moreover, goods having a larger length and/or width should be placed in lower layers to stabilize the load during delivery. Therefore, the number (an integer) of segments is determined by dividing the container length by the length of a relatively larger good. Although the advancing direction of the container 301 and the longitudinal direction of goods coincide in the figure, they do not necessarily coincide.

(Step S2) . . . Determination of a sum of length of goods for assembling and storage The length of goods for assembling and storage is then determined so that one assembling and storage line 303 can substantially store the quantity of goods which can be contained in one segment of the container. As shown in FIGS. 4a and 4b, the goods stored in the assembling and storage line 303 (1) are to be loaded in the segment (1) of the container 301. Similarly, the goods stored in the assembling and storage lines 303 (2), (3), (4) and (5) are to be consecutively loaded in the segments (2), (3), (4) and (5) of the container 301. The segment (6) of the container 301 is left vacant as there are no more goods (the goods are divided into 5 groups).

(Step S3) . . . Generation of diverting data

It is assumed for purposes of examples that orders have been received from 15 stores for this delivery, as listed in the following Table.

The alphabetical letters, a through g, denote specific items of goods, which are arranged in the order of lengths as shown in FIGS. 4a and 4b. As is obvious from the Table, the order fluctuates widely by items. The destinations or stores are rearranged in the order of loading while the goods are arranged in the order of length. Then, for each store, from the first store or destination the quantity of a item of goods is multiplied with its length, and resulting goods of each item are added to obtain the sum from the left to the right. When the sum almost reaches the length of one assembling and storage line, collection of the data for that assembling and storage line is suspended.

TABLE

| Destination (store) | | Goods | | | | | | | | 5 segments | |
|---|---|---|---|---|---|---|---|---|---|---|---|
| | | Order of length → | | | | | | | | Segment number | Number of goods |
| | | a | b | c | d | e | f | g | Total | | |
| Order of loading in a container (Counter-current to delivery order) | 1 | 2 | 2 | 4 | 5 | 3 | 2 | 3 | 21 | ① | 29 |
| | 2 | 0 | 1 | 2 | 1 | 1 | 0 | 1 | 6 | | |
| | 3 | 1 | 1 | 1 | 0 | 0 | 0 | 0 | 3 | ② | 27 |
| | 4 | 3 | 4 | 2 | 3 | 3 | 3 | 3 | 21 | | |
| | 5 | 2 | 1 | 1 | 1 | 3 | 0 | 3 | 11 | ③ | 31 |
| | 6 | 1 | 2 | 0 | 1 | 0 | 1 | 0 | 5 | | |
| | 7 | 0 | 1 | 2 | 2 | 4 | 4 | 0 | 13 | | |
| | 8 | 1 | 1 | 2 | 3 | 2 | 1 | 2 | 12 | | |
| | 9 | 1 | 0 | 1 | 1 | 0 | 1 | 1 | 5 | ④ | 30 |
| | 10 | 2 | 0 | 3 | 1 | 3 | 2 | 1 | 12 | | |
| | 11 | 0 | 5 | 1 | 1 | 1 | 1 | 1 | 10 | | |
| | 12 | 0 | 2 | 0 | 1 | 2 | 2 | 0 | 7 | ⑤ | 28 |
| | 13 | 2 | 2 | 1 | 2 | 1 | 1 | 0 | 9 | | |
| | 14 | 1 | 1 | 2 | 1 | 2 | 0 | 0 | 7 | | |
| | 15 | 1 | 1 | 0 | 0 | 0 | 1 | 0 | 3 | | |
| Sub-total | | 17 | 24 | 22 | 23 | 25 | 19 | 15 | 145 | | 145 |
| Total | | | | | | | | | | | 3000 |

The goods which have beeb counted by then are grouped as one group, and attached with a line number (1) for the goods grouped. The diverting data are prepared so that the particular group should be diverted to and stored on the line (1). The Table shows the total of 145 goods which have the destinations of 15 stores being divided into 5 groups with consideration of length of an assembling and storage line, volume of a container and delivery efficiency. The group (1) comprises 21 goods for the store No. 1, 6 goods for the store No. 2, and 2 goods for the store No. 3 in total of 29 goods. Similarly, the group (2) comprises 1 good for the store No. 3, 21 goods for the store No. 4, and 5 goods for the store No. 5 in total of 27 goods; the group (3) comprises 6 goods for the store No. 5, 5 goods for the store No. 6, 13 goods for the store No. 7, and 7 goods for the store No. 8 in total of 31 goods; the group (4) comprises 5 goods for the store No. 8, 5 goods for the store No. 9, 12 goods for the store No. 10 and 8 goods for the store No. 11 in total of 30 goods; the group (5) comprises 2 goods for the store No. 11, 7 goods for the store No. 12, 9 goods for the store No. 13, 7 goods for the store No. 14 and 3 goods for the store No. 15 in total of 28 goods. The numbers of the five groups meet more or less the number of 30 goods.

The order listed in the Table is determined according to a quantity of destination and the order of delivery for each container by the host computer (CPU) 201.

(Step S4) . . . Preparation of batch picking data

As described above, plural goods are assembled for each container and almost all the assembling and storage lines 303 are allocated with goods which are divided in the unit of one container.

The total of the goods are then regarded as the whole picking volume. In other words, the volume of goods on each assembling and storage lines becomes a picking number, which is 3000 in the above Table. The number of goods is summed for all the containers in the unit of items. Picking data are then prepared in a manner to pick up the goods in the order of lengths.

Figure 5:
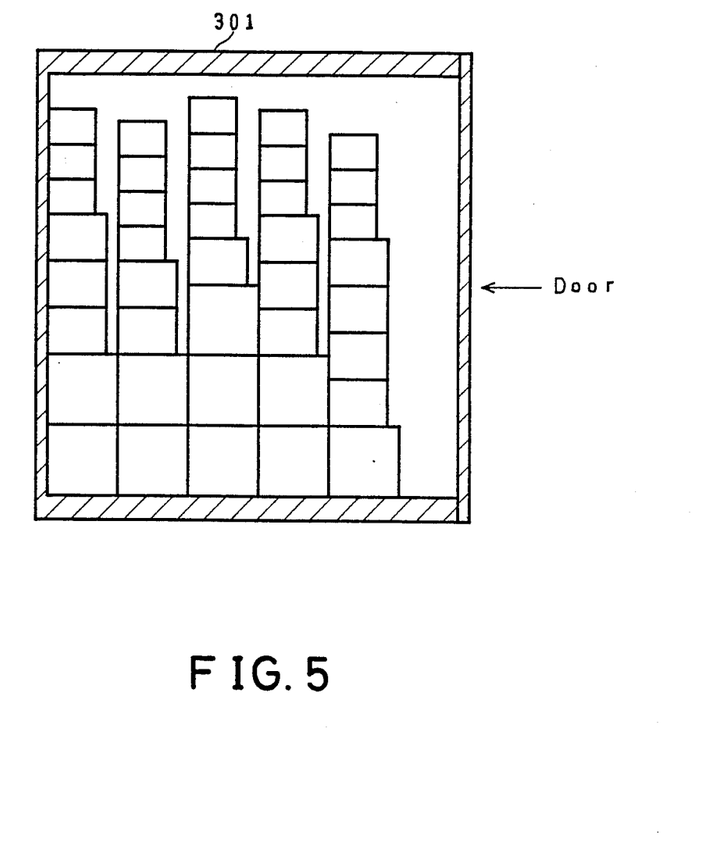
FIG. 5 is a schematic sectional view to principally show the loading state of goods in a container according to one embodiment of this invention method.

As described in the foregoing, goods are piled and loaded in the container 301 in a predetermined state as one example illustrated in principle in FIG. 5.

This invention method enables the following: The host computer (CPU) 201 calculates data on plural (sometimes singular) stores or destinations for one container (or one vehicle) as well as the order of delivery; then the physical distribution control computer 202 processes the above data to generate batch picking data; based on the batch picking data, goods are picked up in batch to thereby pick up goods for a plural number of containers simultaneously at higher efficiency compared to the prior art picking method which was limited to one container volume.

This invention method enables storing goods as long as the length of an assembling and storage line within the segmental volume of a container by determining the number of goods with the number of segmentations of the container, space for assembling and storage is thereby at higher efficiency compared to the prior art assembling and storage method which was limited to one store. In the embodiment of the order listed in the Table, as shown in FIGS. 4a and 4b, goods are arranged in the order of length of items of goods a, b, c, d, e, f, and g.

In this invention method goods are carried out from assembling and storage line 303 (1) to be sequentially loaded in the segment (1) of the container 301. In this manner, the goods intended for the stores Nos. 1 and 2 and a part of those intended for the store No. 3 are piled up in the unit of items. If a distributor (driver) delivers the goods in the order of the stores 3, 2 and 1, the distributor (driver) will find the goods in the order of delivery immediately inside the rear door as soon as he/she opens it. This method of loading never places the goods which would be unloaded last at the rearmost side or immediately inside the rear door or never places the goods which should be unloaded first at the farthest end. Rather, this always allows the distributor to unload the goods from the nearest segments first to achieve the same effect as the goods are loaded in accordance with the stores. This not only permits the distributor to unload the goods efficiently but also allows anotehr worker to share the work of loading in loading stations so that the distribution schedule for the distributor can be more effectively planned.

Figure 6A:
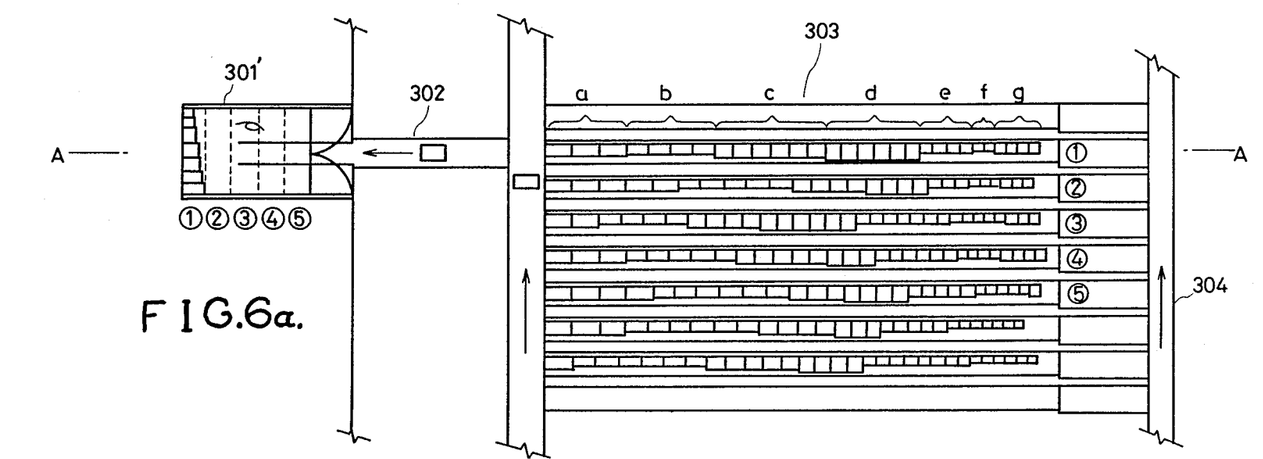
FIG. 6a is a schematic plane view to show essential portions of a sorting system according to another embodiment of this invention method.
Figure 6B:
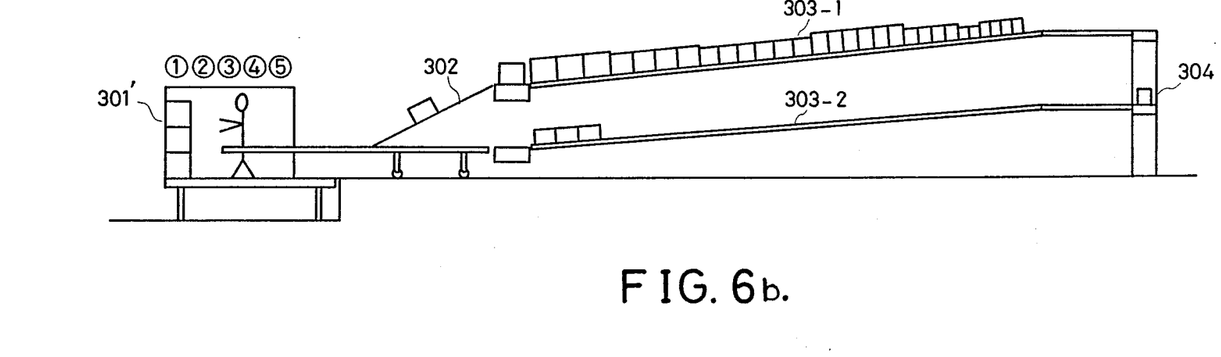
FIG. 6b is a schematic sectional view of the system shown in FIG. 6a when viewed from the line A—A.
Figure 7:
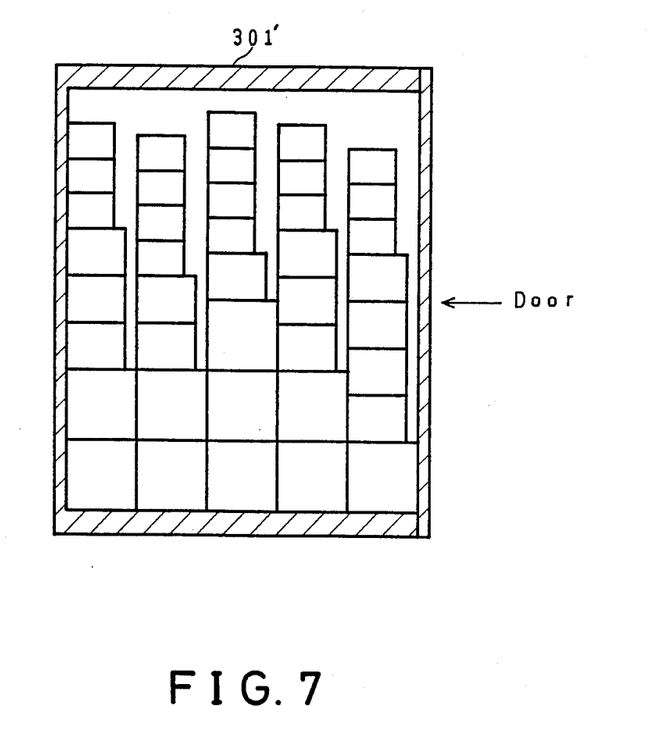
FIG. 7 is a schematic sectional view to principally show the loading state of goods in a container according to another embodiment of this invention method.

FIG. 6a is a schematic plan view to show essential portions of a sorting system according to another embodiment of this invention method, and FIG. 6b a schematic sectional view thereof when viewed from the line A—A. FIG. 7 is a schematic sectional view to show principally the state of loading of goods in a container according to another embodiment of this invention method. In another embodiment, the container 301 used in the embodiment shown in FIGS. 4a and 4b is replaced by a container 301' having a smaller volume where goods are piled in five segments in a manner not to leave a vacant space on the bottom. In other words, when forming the data using the Table above, data for one segment are formed when the sum of the lengths becomes almost equal to one fifth of the total lengths of the goods which are to be loaded in the container 301'. Instead of the container 301' of the smaller volume, it is possible to use the container 301 shown in FIGS. 4a and 4b; the divider may be set at an integer (in this case six) by dividing the length of the container by the length of a relatively large good to thereby decrease thequantity of goods for one segment and set the amount in the segment almost equal to each other.

As is obvious from FIG. 7, because goods are piled at an even height all over the container in this embodiment, the piled goods will not collapse during delivery but will be safely delivered to destinations.

An embodiment of a sorting system according to this invention method will now be described referring to attached drawings. The physical distribution system shown in FIG. 2 will be referred to in description.

Figure 8:
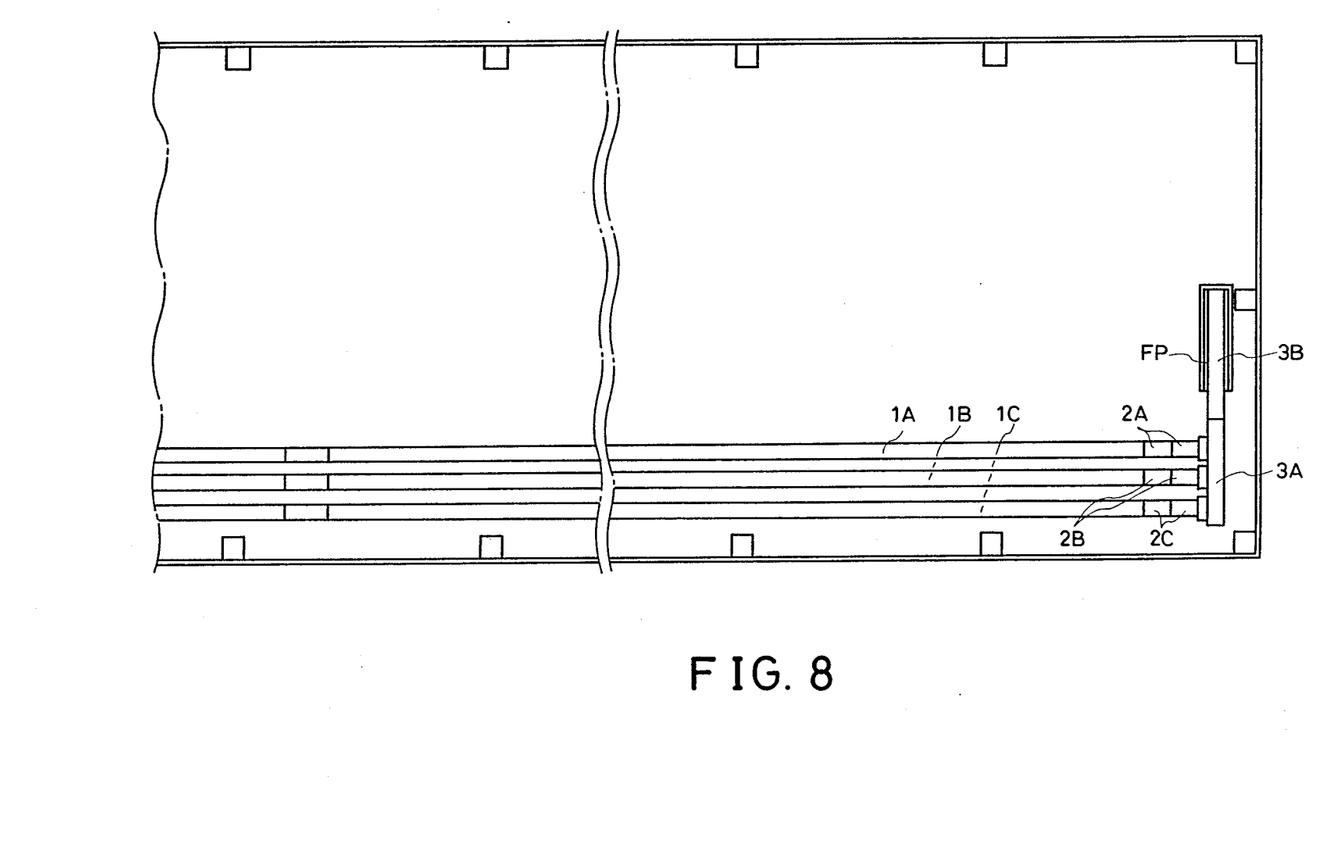
FIG. 8 is a plane view of installed storage lines according to one embodiment of this invention sorting system.
Figures 9A, 9B, 9C:
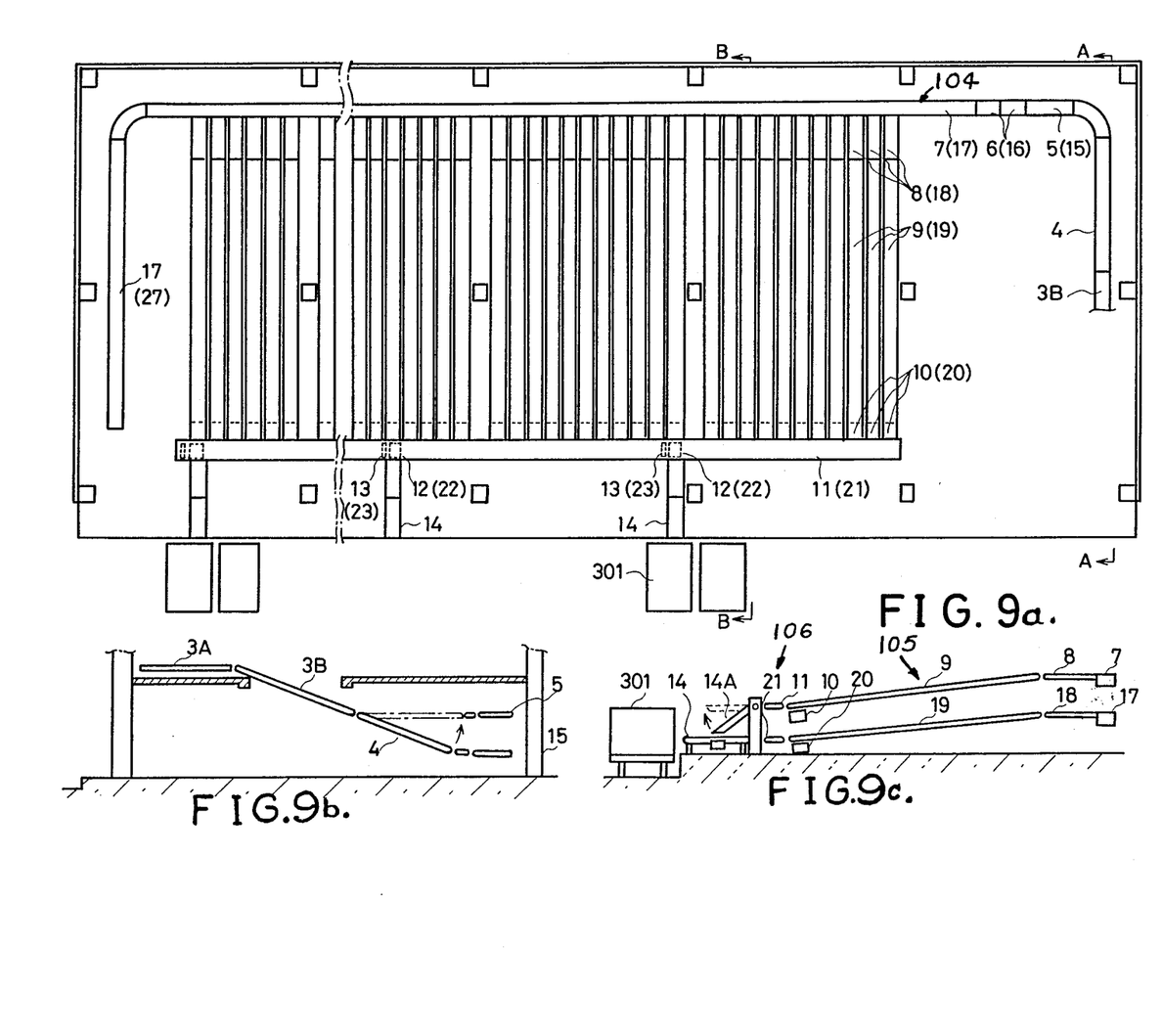
FIGS. 9a, 9b and 9c are respectively a plane installment view, a side view viewed from the line A—A, and another side view viewed from the line B—B of the installment of lines according to the embodiment of this invention system.

FIG. 8 is an installing plan view of storage line 102, FIGS. 9a, 9b, and 9c are installing plan views including assembling and storage line 105 installed downstairs of the storage line 102.

In the storage line 102 goods which have been stored temporarily according to said batch picking data are placed on three sets of storage conveyors 1A, 1B, and 1C respectively.

The merging conveyor line 103 which carries a predetermined number of goods in a batch to the next step comprises three sets of acceleration conveyors 2A, 2B, and 2C which are provided at the outlet terminals of storage conveyors and which carry out goods one by one, and merging conveyors 3A and 3B which are provided substantially perpendicular to said acceleration conveyors. The merging conveyor 3B extends in inclination through a floor pit FP bored in the floor to carry the goods to a switching conveyor 4 installed downstairs as shown in FIG. 8.

FIG. 9a is a layout of downstair lines including diverting line 4, assembling and storage lines 5, carrying-out line 6, and loading conveyor lines 7, and FIGS. 9b, 9c are side views when viewed from the line A—A and B—B respectively.

As shown in FIG. 9b, the switching conveyor 4 is adapted to mvoe up and down at the right end in the figure so that it can convey goods to either conveyor 5 or 15 installed in two layers. When viewed from above FIG. 9a, those conveyors in two layers are denoted by a first number and the other number in parenthesis.

The goods which have been conveyed on the conveyors 5 and 15 are given a certain interval with index feeders 6 and 16. A diverting line 104 comprises diverting conveyors 7 and 17 with diverting devices, and diverts goods based on the diverting data into a large number of lead-in conveyors 8 and 18 which are provided substantially perpendicular to the diverting conveyors 7 and 17. An assembling and storage line 105 comprises inclined roller conveyors 9 and 19 as whwn in FIGs. 9a and 9c, and the goods which have been carried by the lead-in conveyors 8 and 18 travel with their own gravity on the slope to be asembled and stored.

Figure 11A:
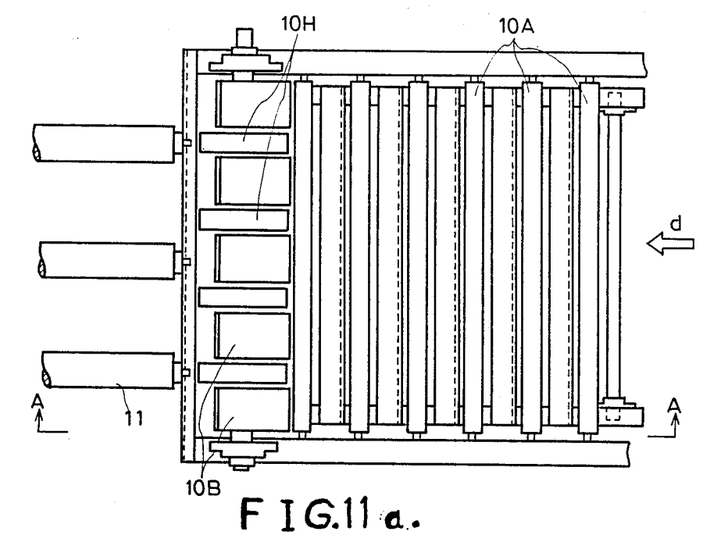
Figure 11B:
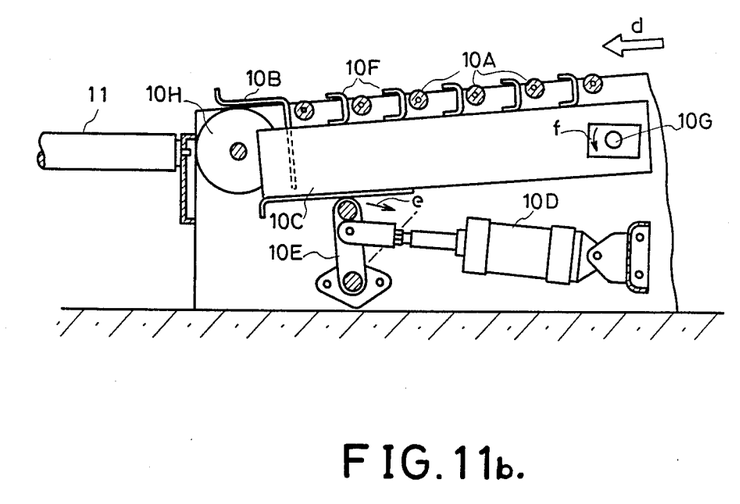

A carrying-out line 106 comprises carrying out devices 10 and 20, and conveyors 11 and 21, and when a container number is specified, the stoppers of the carrying out devices 10 and 20 are released to carry out goods in the unit of a container for each line (See FIGS. 11a and 11b).

The carried out goods are moved for the loading station for a container by conveyors 11 and 21 with transfer feeders 12 and 22 and stoppers 13 and 23, and replaced onto a loading conveyor 14 (container loader 302) of the loading conveyor line 107.

A switching chute 14A is provided between the upper conveyor 11 and the loading conveyor 14 as shown in FIG. 9c in a manner that when goods are carried out from the upper conveyor 11, the chute 14A is lowered to be connected and when goods are carried out from the lower conveyor 21, it is raised to be separated at the position shown with broken line. Goods are conveyed to the container 301 via the loading conveyor 14 in this manner.

Description will now be given to the operation of sorting and moving of goods on each line.

Figure 10A:
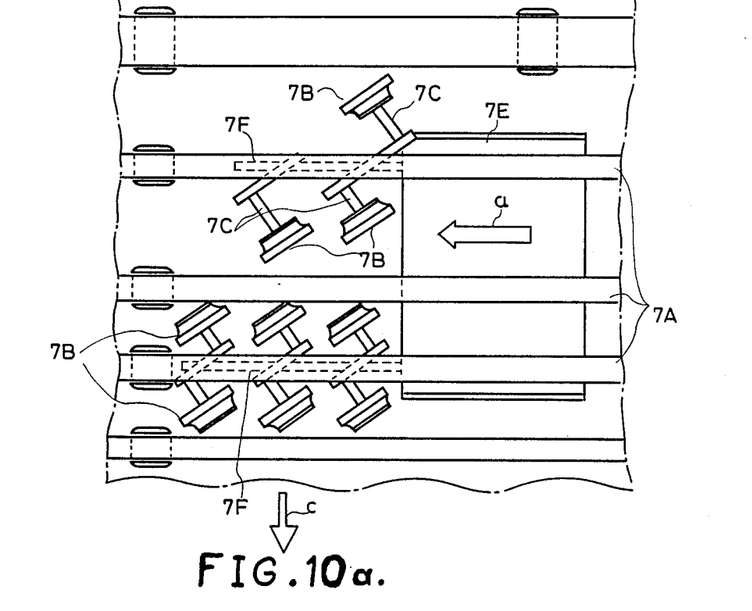
Figure 10B:
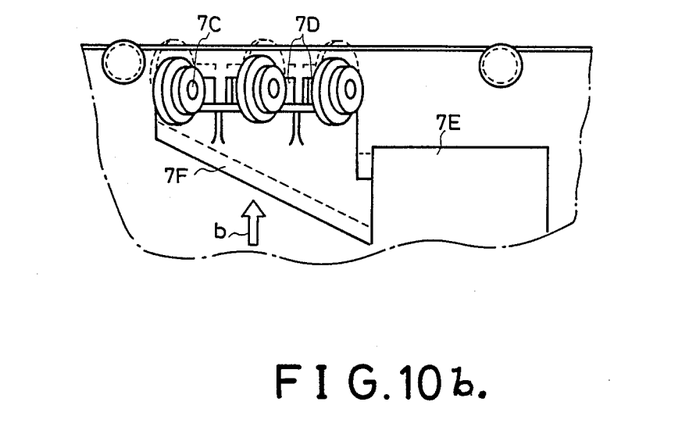

FIGS. 10a and 10b are explanatory views of operation of the diverting conveyor 7 (17); FIG. 10a is a plan view and FIG. 10b a frontal view. In the figures, plural conveyor belts 7A move the goods (not shown) in the direction of the arrow mark a. Between the conveyor belts 7A are provided skewed wheels 7B at prescribed positions with rotational shafts 7C thereof at a predetermined angle against the advancing direction of the conveyor 7A. The rotational shaft 7C is supported by a bracket 7D in a manner to allow free rotation of a skewed wheel 7B, and the bracket 7D is supported on a pop-up device 7E via an arm 7F. A set of diverting conveyor 7 (17) is provided for each of the lead-in conveyors 8 (18) shown in FIG. 9a.

As described above, in the conveyors 7 (17) which is selected for the lead-in conveyor 8 (18) with the commands of diverting data, the skewed wheels 7B are pushed up in the direction of the arrow b by the pop-up device 7E as shown in FIG. 10b to the position shown with broken line so that the goods can move in the direction of the arrow c to finally move to the lead-in conveyors (not shown).

FIGS. 11a and 11b are explanatory views of the operation of the carrying out devices 10 (20) which carry out stored goods on the assembling and storage lines 105; FIG. 11a is a plan view and FIG. 11b a side view from the line A—A thereof.

In FIG. 11b, the goods (not shown) travel on a free roller 10A in the direction fo arrow d, but they normally are stopped from traveling as a cylinder 10D positions a lever 10E substantially vertical to push up a frame 10C, and a stopper 10B and lift frame 10F are kept at positions above the upper surface of the free roller 10A.

When a predetermined signal is inputted, the cylinder 10D turns the lever 10E in the direction of an arrow e, the frame 10C turns around a shaft 10G in the direction f an arrow f to thereby lower the stopper 10B and lift frame 10F below the upper surface of the free roller 10A. This makes goods (not shown) travel and are moved by a driving wheel 10H into conveyors 11 (21).

FIG. 12 is an explanatory view of the operation of transfer feeders 12 (22) and stoppers 13 (23) which transfer the goods which have been carried on the conveyors 11 (21) in the direction of an arrow g onto the conveyor 14 (not shown) (if the conveyor is at the upper layer, via a switching chute) in the direction of an arrow h. When the goods are not transferred, as the transfer cylinder 12B and the stopper cylinder 13B are not actuated, the upper end of a large number of wheels 12D on the frame 12C and the upper end of a stopper plate 13A become positioned at a level lower than the upper surface of the driving roller 12A. The goods therefore advance thereon in the direction of an arrow g. When a signal for transfer is inputted, the transfer cylinder 12B and the stopper cylinder 13B are actuated in the directions j and k respectively, to push up the wheel 12D and the stopper plate 13A to the positions shown by broken lines, thereby moving the goods in the direction of arrow h.

Over-flow lines 17 and 27 shown in the left side of FIG. 9a store the goods which cannot be diverted as no diverting data are supplied.

The sections above are controlled in operation by the physical distribution control computer 202 and the facilities control computer 203 shown in FIG. 3.

As this invention sorting system comprises plural assembling and storage conveyors which store diverted goods in classified groups, a diverting conveyor which divert the goods carried in items into prescribed assembling and storage conveyors, and a control system which controls said diverting conveyors and assembling and storage of goods to thereby effectively perform dividing and loading operations of goods according to this invention sorting method.

Description has been made to preferred embodiments of this invention method and a system thereof in the foregoing, but this invention is not limited to those. For example, the length of roller conveyors 9 (19) may be made identical to the length of an assembling and storage line to eliminate the steps S1 and S2 in FIG. 1.

The diverting lines 104, assembling and storage lines 105, and carrying-out lines 106 may be installed in one layer instead of two. The two layer structure is advantageous, however, in that while goods are being assembled and stored in the lower layer, already assembled and stored goods on the upper layer will be moved to the carry-out conveyor to enhance the efficiency. As the diverting conveyors 7 and 17 are not used simultaneously, the controller for them may be the one set.

The diverting conveyor 7 (17) may be a sorter of the tray type. The trucks may have containers which are not detachable or may be freight cars.

What the claim is:

1. A method for sorting a large number of goods substantially in an order which they will be delivered, comprising the steps of:
    determining an order of delivery of said goods;
    determining a number of groups based on data indicative of said goods and a storage space for said goods; and
    arranging each of the goods into said groups substantially in the order of delivery.

2. The method for sorting goods as claimed in claim 1 including determining an indication of an amount of goods for each group to make said indication for each group substantially equal to an indication for each other group depending on the number of groups which have been formed in advance.

3. The method for sorting goods as claimed in claim 1 or 2 including the step of determining said indication of goods using a length of each good.

4. The method for sorting goods as claimed in claim 1 or 2 including the step of conveying goods, within each said group, in the order of size of the item units from a larger kind being conveyed first to a smaller kind being conveyed last.

5. A system for sorting goods which sorts a large number of goods substantially in the order of deliveries, comprising:
    a plurality of assembling and storage conveyors which form assembly groups for prescribed goods,
    diverting conveyor means, receiving a plurality of goods for individually diverting each good into said assembling and storage conveyors, and
    control means for controlling said diverting means by:
    (1) determining an order of delivery of said goods,
    (2) determining which of said assembly groups each of said goods should be conveyed so that said goods will be arranged substantially in the order of delivery, and
    (3) controlling said diverting conveyor means to convey each said good to an appropriate assembling conveyor, cprresponding to a group.

6. The system for sorting goods as claimed in claim 5 wherein said assembling and storage conveyors and said diverting conveyor are provided in two layers.

7. The system for sorting goods as claimed in claim 5 or 6 wherein said control means includes a physical distribution control computer which generates sorting data, diverting data and assembly data, a facilites control computer which generates necessary control commands out of said sorting data, diverting data and assembly data from said physical distribution control computer and means which controls predetermined functions with said control commands from the facilities control computer.

8. A method as in claim 1 wherein said arranging goods step comprises the steps of:
    determining a size of goods in each said group,
    determining a group to be full when said size reaches a predetermined amount, and
    beginning grouping goods into a next group when said group is determined to be full.

9. A system as in claim 5 wherein each fo said plurality of assembly and storage covneyors hold goods for one of said groups.

10. A system as in claim 9 wherein said control means is also for determining a total size of goods in said group, and determining a group to be full when said total size reaches a predetermined amount.

11. A system as in claim 9 further comprising means for rearranging goods on each of said plurality of assembly and storage conveyors, and wherein said control means is also for commanding said rearranging means to sort goods within each group, so that larger goods are on the bottom and smaller goods are on the top.

12. Apparatus for loading a delivery vehicle so that items are arranged substantially in an order of delivery comprising:
a plurality of conveying means, each for storing a plurality of goods to be delivered;
first means, receiving goods to be delivered, for conveying each said good to an input end of one of said conveying means;
second means, adjacent an output end of said plurality of conveying means, for conveying goods from said conveying means to said delivery vehicle; and control means for:
(1) determining a number and size of each said good, and a number of groups,
(2) assigning each said group to a portion of said delivery vehicle and to at least one of said conveying means;
(3) assigning each said good to one of said groups in a way such that said goods will be stored substantially in the order of delivery, and
(4) controlling said second means to convey said groups to said delivery vehicle, in order.

13. An apparatus as in claim 12 wherein said control means assigns each said group to one of said conveying means.

14. Apparatus as in claim 12 further comprising sorting means for sorting goods on each of said conveying means, and wherein said control means is also for commanding said sorting means to sort goods such that larger goods will be on the bottom and smaller goods will be on the top.

15. Apparatus as in claim 13 further comrising sorting means for sorting goods on each of said conveying means, and wherein said control means is also for commanding said sorting means to sort goods such that larger goods will be on the bottom and smaller goods will be on the top.

16. Apparatus as in claim 15 wherein an amount in each said group is determined by a length of said device.

17. A method for loading a delivery vehicle so that items are arranged substantially in an order of delivery, comprising the steps of:
determining a number and size of each good to be delivered;
determining a number of groups;
assigning each group to a portion of the delivery vehicle and to a conveying and storing device;
determining an order of delivery;
assigning each of said goods to one of said groups in a way such that each said good will be stored in said delivery vehicle substantialy in the order of delivery; and
storing goods in the delivery vehicle in group order, by emptying ones of said conveying devices serially.

18. A method as in claim 17 comprising the further step of sorting goods on each said conveyor device so that larger goods are stored below smaller goods.

19. A method as in claim 17 comprising the further step of determining each said group so that a height of each said group will be substantially equal to the height of all other groups.

* * * * *